United States Patent Office 3,649,663
Patented Mar. 14, 1972

3,649,663
COBALT II HALIDE KETAZINE AND ALDAZINE COMPLEXES
Christian H. Stapfer, Newtown, and Richard W. D'Andrea, New Hope, Pa., assignors to Carlisle Chemical Works, Inc., Reading, Ohio
No Drawing. Filed Mar. 31, 1970, Ser. No. 24,379
Int. Cl. C07f *15/02, 21/00*
U.S. Cl. 260—439 R             10 Claims

ABSTRACT OF THE DISCLOSURE

Cobalt II halides complexes of the formula

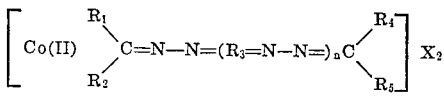

are prepared where $R_1$ and $R_4$ are hydrogen, alkyl, aryl, haloaryl, haloalkyl, aralkyl, furyl, tetrahydrofuryl and $R_2$ and $R_5$ are alkyl, aryl, haloaryl, haloalkyl, aralkyl, furyl, tetrahydrofuryl or

together is cycloalkyl of at least 3 carbon atoms and

together is cycloalkyl of at least 3 carbon atoms, $R_3$ is alkylene or arylene, $n$ is 0 or 1 and X is halogen. The compounds are useful as driers for alkyd resins and to accelerate the oxidative polymerization of olefinic polymer systems, particularly unsaturated polyesters, in conjunction with organic peroxides. The compounds can also be used to form mixed bidentate ligand chelates as well as mixed bidentate unidentate ligand chelates of the formula

where Az is

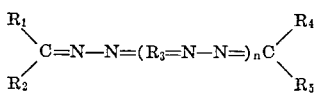

which have the same uses.

---

This invention relates to novel cobalt complexes and their use in drying alkyd coating compositions and autoxidation of olefinic materials.

Cobaltous halides are known to form various complexes with a multitude of organic ligands among which those containing nitrogen occupy a prominent place.

The term "paint" is used herein to include oil-based paint, water-based and organic-based varnishes, lacquers and similar coating compositions which may be clear, pigmented, or contain dyes.

The curing or drying of coating compositions such as alkyd paint formulations is frequently catalyzed by various metal salts. Cobalt soaps are especially preferred as paint dryers because they most actively promote the formation of free radicals at loci of unsaturation in films of coatings and paint. The production of these free radicals catalyze an autoxidation process resulting in actual crosslinking within the film. However, cobalt salts have had several disadvantages prior to my invention. In addition to high cost, cobalt salts cause extensive wrinkling in paint films when used in amounts necessary to produce commercially desirable drying times. It has been usually necessary to replace a portion of the cobalt salt with a salt of a less expensive metal because of the high cost and in order to prevent wrinkling, the replacement of the amount of cobalt salt necessary to prevent wrinkling results in a substantial increase in the time required for drying. Attempts have been made to accelerate the drying of alkyd paints by including compounds such as 1,10-phenanthroline, 2,2'-bipyridine or 8-hydroxyquinoline. While these accelerators have been used for cobalt and manganese drying catalysts, they have not attained significant commercial importance. Although they may be good accelerators, these compounds are far too expensive to be used in the necessary amounts and also promote discoloration of the paint film. For example, 1,10-phenanthroline cannot be used in quantities exceeding 0.05 weight percent of the paint because higher concentrations cause the paint film to yellow and when used in levels of 0.05 weight percent, the acceleration of drying time is not sufficient to offset the increase in cost.

Hydrazines have also been proposed as activators in drying alkyd paints but they cause extreme discoloration (yellowing), surface wrinkling and deterioration. Moreover, they are not as active as would be desired.

It is also well known that the crosslinking polymerization of olefinic polymers such as styrene or butadiene modified polyester resins proceed by oxygen transfer using organic peroxides as a source of free radical and the same cobalt carboxylates as above as cocatalysts. Although cobalt soaps are the preferred cocatalysts for the polymerization of these resins, mainly because they allow good curing characteristics and dimensional stability, the time span in which they cause the polymeric resin to gel is long and, should one want to reduce said time span by increasing the amount of cobalt, they have a tendency to severely discolor the resin.

Furthermore, in various applications where the polyester resin formulation contains water, cobalt carboxylates are altogether inadequate to promote crosslinking.

The use of various pyridine compounds including 2-pyridine aldazine has been proposed as accelerators for cobalt and other driers in Wheeler Pat. 2,961,331. However, the pyridine aldehydes required to make the azines are expensive. Furthermore, it was considered essential to have the pyridine nucleus present.

It is an object of the present invention to prepare novel cobalt azine complexes.

Another object is to provide novel driers for drying alkyd coating compositions and unsaturated polyesters.

It has now been found that these objects can be attained by preparing novel cobalt II halide complexes of azines. Such complexes have the Formula 1.

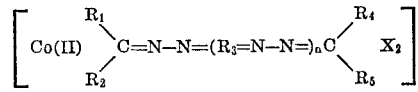

(I)

where $R_1$ and $R_4$ are hydrogen, alkyl, aryl, haloaryl, haloalkyl, aralkyl, furyl, tetrahydrofuryl and $R_2$ and $R_5$ are alkyl, aryl, haloaryl, haloalkyl, aralkyl, furyl, tetrahydrofuryl, or

together is cycloalkyl of at least 3 carbon atoms, preferably 5 to 6 carbon atoms and

together is cycloalkyl of at least 3 carbon atoms, preferably 5 to 6 carbon atoms, $R_3$ is alkylene or arylene, $n$ is 0 or 1 and X is halogen. Such complexes exhibit valuable properties as catalysts in homogeneous systems. The azine complexes are soluble in solvents susceptible to supply unidentate ligands of the yet unfilled coordination sites of the metal atom. Thus a cobalt (II) chloride monoazine (Az) chelate is soluble in dimethyl formamide and forms a mixed ligand complex such as (2)  $[Co(II)(Az)(DMF)_{1-4}]Cl_2$ The cobalt azine complexes also have the ability to accommodate other bidentate ligands such as diamines, bipyridine, etc., to form stable mixed ligand chelates such as, for instance (3)  $[Co(II)(Az)(Bipy]X_2$ The new cobalt (II) halide-azine chelates and their mixed ligand analogs described above have been found to be very potent catalysts in various homogeneous or heterogeneous systems.

These complexes have the general formula (4)  $[Co(II)(Az(Y)_m(Z)_{4-2m}]X_2$ wherein X is a halogen; Az is an azine, Y is an organic bidentate ligand containing at least one atom of nitrogen and which is susceptible to chelate the atom of cobalt, but where the coordination bondings are not necessarily nor exclusively limited to the atoms of cobalt and nitrogen but can also exist between the said atom of cobalt and atoms of oxygen, hydrogen or even olefinic linkages; Z is a unidentate ligand formed by the solvent in which the bidentate chelate is soluble; $m$ varies from 0 to 2. Typical bidentate ligands of the Y structure are 1,4-diamino butane, ethylene diamine, o-phenylene diamine, diphenyl ethylene diamine, phenyl biguanidine, dimethyl glyoxime, diacetyl monoxime, diacetyl dioxime, glyceine, glycocoll, α-acetamino pyridine, piperidine, 2,2′ bipyridine, 1,10-phenanthroline, 2,9-dimethyl-1,10-phenanthroline, 4,4′,6,6′-tetramethyl-2,2′-bipyridine and the other substituted bipyridines and phenanthrolines disclosed in Dun Pat. 3,297,788, trimethylene diamine, hexamethylene diamine, ethanolamine, propanolamine, pentamethylene diamine.

Typical unidentate ligands of the Z structure are monohydride alcohols, monofunctional amines, amides, sulfoxides, sulfones, carboxylic anhydrides, pyrroles, pyrrazolines and carbazoles such as methyl alcohol, ethyl alcohol, propyl alcohol, isopropyl alcohol, butyl alcohol, sec. butyl alcohol, t-butyl alcohol, amyl alcohol, octyl alcohol, isooctyl alcohol, 2-ethyl hexyl alcohol, decyl alcohol, isodecyl alcohol, lauryl alcohol, ethyl amine, diethyl amine, propyl amine, isopropyl amine, dipropyl amine, butyl amine, amyl amine, hexyl amine, decyl amine, dodecyl amine, diisobutyl amine, methyl ethyl amine, cyclohexyl amine, dicyclohexylamine, aniline, m-toluidine, 2,3-dimethyl aniline, N-methyl aniline, o-toluidine, acetic anhydride, propionic anhydride, butyric anhydride, valeric anhydride, benzoic anhydride, dimethyl formamide, dimethyl acetamide, dimethyl sulfoxide, pyrrole, 2-methyl pyrrole, 3-methyl pyrrole, 2-ethyl pyrrole, pyrrazoline, 2-methyl pyrrazoline, carbazole, octahydrocarbazole, tetrahydrocarbazole, o-chloroaniline, p-phenetidine, N-ethyl aniline.

The compounds of the invention of Formula 1 (as well as their complexes of Formula 4) are useful for curing drying alkyd resins and as curing agents in other oxidative polymerization reactions such as crosslinking of olefin polymer systems, particularly unsaturated polyesters initiated by organic peroxides. The compounds of the present invention are preferably employed as the sole cobalt source in such curing systems but they can be replaced in part, e.g. up to 90% by conventional cobalt driers, e.g. cobalt 2-ethylhexoate, cobalt naphthenate, cobalt neodecanoate, cobalt resinate, etc.

The compounds of Formula 4 are generally prepared by dissolving compounds of Formula 1 in the appropriate solvent or solvents forming the unidentate or bidentate ligand.

The compounds of Formula 1 are prepared by reacting cobaltous halide with an azine in an alcohol, e.g. methanol or ethanol or any of the other alcohols set forth supra. They can also be prepared by reacting a ketone with cobalt (II) dihydrazinate dihalide.

The ketazine complexes of Formula 1 react with hydrazine or phenyl hydrazine to yield quantitative amounts of the corresponding cobalt II tris hydrazinate (or phenyl hydrazinate) dihalides at room temperature. Thus, 6.4 grams (0.02 mole) of (cyclohexanone azine) cobalt (II) chloride was dissolved in 50 ml. of dimethyl formamide. A solution of 3.0 grams of anhydrous hydrazine in 50 ml. of dimethyl formamide was added with a strong agitation. There was immediately formed cobalt (II) tris hydrazinate dichloride as a pale orange precipitate having the formula $[(N_2H_4)_3Co(II)]Cl_2$. The corresponding cobalt (II) tris (phenyl hydrazinate) dichloride as a salmon pink precipitate was formed by replacing the hydrazine by 9.1 grams of phenyl hydrazine.

To make the starting aldazines and ketazines for preparing the compounds of Formula 1 there can be used any appropriate mono or dialdehyde or mono or diketone such as acetaldehyde, propionaldehyde, butyraldehyde, isobutyraldehyde, valeraldehyde, caproaldehyde, decanal, glyoxal, stearaldehyde, benzaldehyde, o-tolualdehyde, p-tolualdehyde, p-isopropylbenzaldehyde, o-chlorobenzaldehyde, o-fluorobenzaldehyde, p-bromobenzaldehyde, p-fluorobenzaldehyde, glutaraldehyde, terephthaldehyde, m - chlorobenzaldehyde, p - chlorobenzaldehyde, alpha naphthaldehyde, phenyl acetaldehyde, phenylpropionaldehyde, furfural, tetrahydrofurfural, acetone, methyl ethyl ketone, diethyl ketone, di-n-propyl ketone, diisopropyl ketone, isophorone, di-n-amyl ketone, di-n-hexyl ketone, ketone, isoprhorone, di-n-amyl ketone, di-n-hexyl ketone, di-n-octyl ketone, di-n-decyl ketone, laurone, stearone, methyl-n-propyl ketone, methyl isopropyl ketone, methyl-n-butyl ketone, pinacolone, methyl-n-amyl ketone, methyl-n-hexyl ketone, methyl-n-decyl ketone, ethyl-n-propyl ketone, propyl isopropyl ketone, methyl cyclopropyl ketone, 1-chloro-2-propanone (chloroacetone), bromoacetone, cyclobutanone, cyclopentanone, cyclohexanone, 2-methyl cyclohexanone, cycloheptanone, cyclopentadecanone, acetophenone, fenchone, pivalophenone, valerophenone, propiophenone, laurophenone, methyl-2-naphthyl ketone, methyl-1-naphthyl ketone, benzophenone, 1-naphthyl phenyl ketone, furyl methyl ketone, diacetyl, benzil.

As suitable azines for use in preparing the compounds of Formula 1 of this invention, there can be used acetaldazine, propionaldazine, butyraldazine, isobutyraldazine, valeraldazine, acetone azine, methyl ethyl ketazine, diethyl ketazine (3-pentanone azine), methyl propyl ketazine, methyl butyl ketazine, dibutyl ketazine, dipropyl ketazine, ethyl butyl ketazine, ethyl propyl ketazine, propyl butyl ketazine, cyclohexanone azine, p-bromoacetophenone azine, cyclopentanone azine, 2-methyl cyclohexanone azine, cyclobutanone azine, chloroacetone azine, bromoacetone azine, furfuraldazine, 2-chlorobenzaldazine, benzaldazine, acetadehyde acetone azine, acetone acetophenone azine, acetophenone azine, benzophenone azine, cyclohexanone benzaldazine, biacetyl (cyclohexanone diazine), benzil (cyclohexanone diazine), biacetyl (acetaldehyde diazine), benzil (propionaldehyde diazine), caproaldehyde azine, biacetyl diazine, benzil diazine, glyoxal diazine, terephthaldehyde diazine, glyoxal (cyclohexanone diazine), o-tolualdehyde azine, p-isopropylbenzaldehyde azine, p-bromobenzaldazine, o-fluorobenzaldazine, alpha, naphthaldazine, phenyl acetaldazine, phenyl propionaldazine, tetrahydrofurfuraldazine, di-t-butyl ketazine, diamyl ketazine, dihexyl ketazine, dioctyl ketazine, di(-n-decyl) ketazine, di (dodecyl) ketazine, stearazine, cyclopentadecanone azine, pivalophenone azine, valerophenone azine, laurophenone azine, propionphenone azine, methyl-2-naphthyl ketazine, methyl-1-naphthyl ketazine, 1-naphthyl phenyl ketazine, furyl methyl ketazine.

In making the compounds of Formula 1, there are employed cobalt (II) halides such as cobalt (II) fluoride, cobalt (II) chloride, cobalt (II) bromide and cobalt (II) iodide.

Examples of compounds within Formula 1 (cobalt always having a valence of 2) are biacetyl (cyclohexanone diazino) cobalt dibromide (having the formula

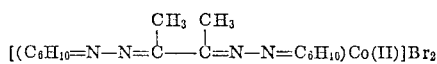

biacetyl (cyclohexanone diazino) cobalt dichloride, benzil (cyclohexanone diazino) cobalt dibromide, glyoxal (cyclohexanone diazino) cobalt dichloride, cobalt dibromide biacetyl diazine, cobalt dichloride glutaraldehyde diazine, cobalt dibromide terephthaldehyde diazine, cobalt dibromide cyclohexanone azine, cobalt dichloride, cyclohexanone azine, cobalt difluoride cyclohexanone azine, cobalt diiodide cyclohexanone azine, cobalt dibromide benzophenone azine, cobalt dichloride, cyclohexanone benzaldazine, cobalt diiodide benzaldazine, cobalt dichloride benzophenone acetophenone azine, cobalt dibromide cyclohexanone benzaldazine, cobalt dibromide benzaldazine, cobalt dichloride acetone azine, cobalt dichloride acetone cyclohexanone azine, cobalt diiodide cyclopentanone azine, cobalt dichloride diacetyl monooxine-acetaldazine, cobalt dichloride acetone benzaldazine, cobalt dibromide acetaldazine, cobalt dichloride propionaldazine, cobalt dibromide, butyraldazine, cobalt dichloride isobutyraldazine, cobalt dibromide valeraldazine, cobalt dibromide acetone azine, cobalt dichloride methyl ethyl ketazine, cobalt dibromide diethyl ketazine, cobalt dichloride methyl propyl ketazine, cobalt dibromide methyl butyl ketazine, cobalt dichloride dibutyl ketazine, cobalt dibromide dipropyl ketazine, cobalt dichloride ethyl butyl ketazine, cobalt dibromide ethyl propyl ketazine, cobalt dichloride propyl butyl ketazine, cobalt dichloride p-bromoacetophenone azine, cobalt dibromide p-chloroacetophenone azine, cobalt dibromide p-fluoroacetophenone azine, cobalt dichloride 2-methyl cyclohexanone azine, cobalt dibromide cyclobutanone azine, cobalt dichloride chloroacetone azine, cobalt dibromide bromoacetone azine, cobalt dichloride furfuraldazine, cobalt dibromide 2-chlorobenzaldazine, cobalt dichloride benzaldazine, cobalt dibromide caproaldehyde azine, cobalt dichloride o-tolualdazine, cobalt dibromide p-isopropylbenzaldazine, cobalt dichloride p-bromobenzaldehyde azine, cobalt dibromide o-fluorobenzaldazine, cobalt dichloride m-chlorobenzaldazine, cobalt dibromide alpha naphthaldazine, cobalt dichloride phenyl acetaldazine, cobalt dibromide phenyl propionaldazine, cobalt dichloride tetrahydrofurfuraldazine, cobalt dibromide dihexyl ketazine, cobalt dichloride di(dodecyl ketazine, cobalt dibromide cyclopentadecanone azine, cobalt dichloride pivalophenone azine, cobalt dibromide laurophenone azine, cobalt dichloride methyl-2-naphthyl ketazine, cobalt dibromide 1-naphthyl phenyl ketazine, and cobalt dichloride furyl methyl ketazine.

Unless otherwise indicated, all parts and percentages are by weight.

The polymerization of unsaturated polyesters by cross-linking is known to occur by free radical initiation and this is usually achieved by using organic peroxides as primary catalysts and source of such free radicals. While the rate of decomposition of the peroxides into free radicals is influenced by the type of peroxide and the temperature used, it is also directly influenced by the addition of accelerators or inhibitors. Accelerators promote the decomposition of peroxides into free radicals at temperatures below those required to release free radicals if the peroxide is used alone.

When used with catalyst-accelerator combinations, standard unsaturated polyester resins show various gelation and cure characteristics which depend on the nature of the said combination. During the polymerization, resins pass through a critical point at which the viscosity increases suddenly (gel point) then harden slowly while undergoing an exothermic polymerization reaction. Both the gel time and the cure exothermic heat have significant influence on the physical properties of the finished product, as well as the practical workability of the resin in various applications.

In the present state of the art, cobaltous carboxylates, such as cobalt naphthenate, are the most active accelerators available, but their limitations are still numerous and the gel time of a standard polyester resin catalyzed with methyl-ethyl ketone peroxide can merely be shortened by only 50% with this accelerator. The cure time, expressed in minutes necessary to reach the polymerization's peak exotherm, takes well over one half hour and the performance cannot be improved by merely increasing the metal content in the polymer. We have found that most bidentate cobalt (II) halide complexes described above surpass by far that of cobalt carboxylates.

When used with acyl peroxides as primary catalysts these cobalt accelerators allow polyester gel times of a few minutes and cure times of less than thirty minutes. One further advantage of these accelerators is their ability to considerably shorten the post gel cure time. In many instances the peak exotherm was observed only minutes after the gel time. This, evidently, allows a versatile gel-cure modifying by means of variations in the peroxide-accelerator ratio.

Furthermore, most of the accelerators disclosed above reduce considerably the air inhibition encountered in coatings applications where the crosslinking polymerization of polyester thin films is usually affected by the presence of relatively large amounts of oxygen. It was thus possible to cure thin polyester films to hardness by incorporating cobalt (II) halide complexes of azines, bipyridine and other bidentate ligands at usage levels as low as 0.0001%, usually 0.001% by weight of the resin. The accelerators can be used at levels as high as 5% (in solution or otherwise) or even higher, e.g. 10%, levels at which they cause extremely rapid polymerizations.

Finally, these new accelerators have the merit to impart only a slight discoloration to the resin as opposed to the dark colors observed in polymers accelerated with metal carboxylates. Another area of application where cobalt II halide azines complexes provide a significant improvement over existing art is the drying of paint films, especially long and medium oil alkyd paint films. They can thus be used as primary drying catalysts in most long oil alkyd formulations which usually require long drying times and relatively high metal concentrations.

It is well known that various soaps of cobalt constitute the preferred paint driers as they are most susceptible to promote the autoxidation process by free radical induction at the sites of unsaturation in the paint film. This autoxidation then leads to the cross-linking and cure of the film. As pointed out before, the new cobalt complexes tend to use oxygen itself as a source of free radicals. The superior performance observed earlier was confirmed when solutions of bidentate chelates of cobalt (II) halides were used as drying catalysts at levels of usage varying from 0.001% to 5% by weight of the paint (they can be used from 0.0001% to 10%). It was further observed that the cobalt (II) azine complexes allowed very little discoloration of a white pigmented film even when used at relatively high percentage levels.

In the crosslinking of olefinic polymer systems, e.g. unsaturated polyesters, there are included peroxides as is conventional in the art. The peroxide can be 0.05 to 5%, based on the polymer. Examples of suitable peroxides include methyl ethyl ketone peroxide, dicumyl peroxide, benzoyl peroxide, cumene hydroperoxide, di (t-butyl peroxide), m-bis (α-t-butylperoxyisopropyl) benzene, methyl isobutyl ketone peroxide, cyclohexanone peroxide, methyl tetrahydrofurane hydroperoxide, bis (4-chlorobenzoyl) peroxide, phthalyl peroxide, dilauroyl peroxide, t-butyl peracetate, diacetyl peroxide, di (2,4-dichlorobenzoyl) peroxide, dipelargonyl peroxide, 3,5-dihydroxy-3,5-dimethyl-1,2-dioxacyclopentane, t-butyl peroxybenzoate, t-butyl peroxy (2-ethylhexanoate) O,O-t-butyl O-isopropyl mono peroxycarbonate, 2,5-dimethyl-2,5-di (benzoylperoxy) hexane, t-butyl peroxy (2-ethylbutyrate), 2,5-dimethyl-2,5-di (2-ethylhexanoylperoxy) hexane, di-t-butyl diperoxyphthalate, O,O-t-butyl hydrogen monoperoxymaleate, n-butyl 4,4-bis (t-butylperoxy) valerate, 2,5-dimethyl - 2,5 - bis (t-butylperoxy)hexane, bis-(p-bromobenzoyl) peroxide.

Any of the conventional pigments can be employed in the paints such as titanium dioxide, ferric oxide calcium oxide, zinc oxide, ochre, litharge, white lead, clays, e.g. kaolin and china clay, calcium carbonate, silica, talc, asbestos, diatomaceous earth, basic lead carbonate, whiting lithopone, zinc sulfide, antimony trioxide, barium sulfate, red lead, Spanish oxide, burnt sienna, red iron oxide, Venetian red, cadmium red, cadmium sulfoselenide, cadmium-mercury sulfide, raw umber, burnt umber, sienna hydrated yellow iron oxide, chrome yellow, chrome orange, molybdenum orange, zinc chromate, basic zinc chromate, cadmium yellow, chrome green, chromium oxide green, iron blue, ultramarine, blue basic lead sulfate, carbon black, precipitated black iron oxide and metallic pigments, e.g. aluminum powder.

Conventional paint solvents can be employed such as aromatic and aliphatic hydrocarbons, e.g. benzene, toluene, xylene, aromatic naphtha, mineral spirits, isooctanes, hexane petroleum ether and VM&P naphtha, as well as water for water-based paints.

The drying accelerators of the present invention can be employed with any of the conventional drying alkyd resins and unsaturated polyesters.

The curing alkyd resins can be made from acids (or the anhydrides if available) such as phthalic anhydride, isophthalic acid, trimellitic acid, pyromellitic acid, trimesic acid, maleic anhydride, fumaric acid, azelaic acid, succinic acid, adipic acid, tetrahydrophthalic anhydride, tetrachlorophthalic anhydride, dimerized fatty acids and sebacic acid reacted with polyhydric alcohols such as glycerol, pentaerythritol, dipentaerythritol, trimethylolethane, sorbitol, trimthylolpropane, ethylene glycol, propylene glycol, neopentylene glycol and dipropylene glycol together with drying oils such as soyabean oil, linseed oil, tung oil, dehydrated castor oil, fish oil, corn oil, perilla oil, safflower oil, oiticica oil and cottonseed oil, as well as the acids of such drying oils and tall oil acids.

Unless otherwise indicated, all parts and percentages are by weight.

Typical suitable unsaturated oil or fatty acid modified alkyd resins are set forth below. They can have oil lengths of 30 to 70 or even higher.

|  | Parts |
|---|---|
|  | Alkyd A |
| Tall oil fatty acids | 127.0 |
| Pentaerythritol | 73.3 |
| Ethylene glycol | 34.9 |
| Phthalic anhydride | 145.0 |
| Maleic anhydride | 3.0 |
| Acid number | 12 |

|  | Alkyd B |
|---|---|
| Soyabean oil | 130.0 |
| 98% glycerol | 90.0 |
| Phthalic anhydride | 145.0 |
| Maleic anhydride | 3.0 |
| Acid number | 8 |

|  | Alkyd C | Alkyd D |
|---|---|---|
| Soyabean oil | 25.0 |  |
| Litharge | 0.06 |  |
| Pentaerythritol | 60.0 | 110.0 |
| Phthalic anhydride | 148.0 | 148.0 |
| Tall oil fatty acids |  | 260.0 |
| Ethylene glycol |  | 12.5 |
| Acid number | 10 | 10 |

|  | Alkyd E | Alkyd F |
|---|---|---|
| Soyabean oil | 132.0 | 175.0 |
| Linseed oil | 132.0 |  |
| Dehydrated castor oil |  | 50.0 |
| Litharge | 0.09 | 0.05 |
| Pentaerythritol | 91.0 |  |
| Glycerol |  | 83.0 |
| Phthalic anhydride | 148.0 | 145.0 |
| Maleic anhydride |  | 3.0 |
| Acid number | 12 | 8 |

|  | Alkyd G | Alkyd H |
|---|---|---|
| Tall oil fatty acids | 322.0 | 230.0 |
| Safflower oil |  | 156.0 |
| Litharge |  | 0.04 |
| Pentaerythritol | 126.0 | 109.0 |
| Phthalic anhydride | 148.0 | 148.0 |
| Acid number | 10 | 8 |

|  | Alkyd I | Alkyd J |
|---|---|---|
| Soyabean oil | 366.0 |  |
| Menhadan oil |  | 400.0 |
| Litharge | 0.08 | 0.10 |
| Pentaerythritol | 81.0 | 75.0 |
| 98% glycerol |  | 23.0 |
| Phthalic anhydride | 145.0 |  |
| Isophthalic acid |  | 166.0 |
| Maleic anhydride | 3.0 |  |
| Acid number | 10 | 12 |

|  | Alkyd K | Alkyd L |
|---|---|---|
| Tall oil fatty acids | 719.0 | 1,740.0 |
| Pentaerythritol | 173.0 | 284.0 |
| Isophthalic acid | 166.0 | 166.0 |
| Acid number | 10 | 12 |

|  | Alkyd M | Alkyd N |
|---|---|---|
| Linseed oil | 700.0 |  |
| Safflower oil |  | 1,180.0 |
| Litharge | 0.07 | 0.08 |
| Pentaerythritol | 71.0 | 80.0 |
| Phthalic anhydride | 148.0 |  |
| Isophthalic acid |  | 166.0 |
| Acid number | 10 | 8 |

Typical examples of unsaturated polyesters, polyester resins are set forth below. In polyesters A through I, the acid and alcohol components prereacted to the indicated acid number were dissolved in styrene to give 70% total nonvolatiles, i.e. the styrene was 30% of the composition.

The final compositions also contained 0.015% of t-butyl catechol.

|  | Parts | |
| --- | --- | --- |
|  | Polyester A | Polyester B |
| 1,2-propylene glycol | 1,700 | 1,700 |
| Maleic anhydride | 1,528 | 1,528 |
| Phthalic anhydride | 770 | 770 |
| Hydroquinone | 0.40 | 0.40 |
| Acid number | 72 | 31.4 |
| Styrene | (1) | (1) |
|  | Polyester C | Polyester D |
| 1,2-propylene glycol | 1,700 | 1,700 |
| Fumaric acid | 1,800 | 603 |
| Phthalic acid | 770 | 2,309 |
| Hydroquinone | 0.42 | 0.46 |
| Acid number | 37.1 | 26.6 |
| Styrene | (1) | (1) |
|  | Polyester E | |
| 1,2-propylene glycol | 1,700 | |
| Fumaric acid | 1,810 | |
| Isophthalic acid | 864 | |
| Hydroquinone | 0.45 | |
| Acid number | 30.3 | |
| Styrene | (1) | |
|  | Polyester F | Polyester G |
| 1,2-propylene glycol | 1,700 | 1,370 |
| Fumaric acid | 1,447 | 1,170 |
| Adipic acid | 1,095 | |
| HET acid | | 2,355 |
| Phthalic anhydride | 126 | 110 |
| Hydroquinone | 0.44 | 0.5 |
| Acid number | 11.7 | 46.7 |
| Styrene | (1) | (1) |
|  | Polyester H | Polyester I |
| Diethylene glycol | 233.4 | 292.0 |
| Ethylene glycol | | 170.0 |
| Maleic anhydride | 196.1 | 343.0 |
| Phthalic anhydride | | 111.0 |
| Adipic acid | | 109.0 |
| p-t-Butyl catechol | 0.02 | 0.02 |
| Acid number | 45 | 25 |
| Styrene | (1) | (1) |

¹ 30% of composition.

As is conventional in the art, the styrene can be 20 to 50% of the total composition. In place of styrene, there can be used other ethylenically unsaturated compounds such as diallyl phthalate, triallyl isocyanurate, acrylamide, N-t-butylacrylamide, triallyl cyanurate, p-vinyl toluene, acrylonitrile, alpha methyl styrene, divinyl benzene, N-vinyl pyrrolidone, methyl acrylate, methyl methacrylate, allyl diglycol carbonate, trimethylolpropane diallyl ether, trimethylolpropane monoallyl ether, allyl ethers of sorbitol, penaerythritol, sucrose and glucose. Any of the polybasic acids and polyhydric alcohols employed in making alkyd resins can be incorporated as components in making the unsaturated polyester resins.

Water thinnable unsaturated polyester formulations can be used, e.g. those shown in Ghosh Pat. 3,463,750 (the entire disclosure of Ghosh is incorporated by reference). A typical formula is that shown in Ghosh Example 1 made from 108 parts trimellitic anhydride, 118 parts phthalic anhydride, 108 parts trimethylolpropane and 269 parts trimethylolpropane-diallyl ether having an acid No. of 50–52 and dissolved in 30 parts isopropanol, 60 parts of 28% aqueous ammonia, 390 parts of water and 90 parts t-butyl alcohol. This solution at 45% solids is hereinafter called Polyester formulation J.

The following examples illustrate the preparation of the novel compounds of the present invention, and the advantages of drying alkyd paint and varnish compositions and unsaturated polyester formulations containing the accelerators and catalysts of the present invention. In the examples it should be understood that reference to "chloride," "bromide" and "iodide" actually is to the "dichloride," "dibromide" and "diiodide."

The standard procedure for evaluating films was the determination of time until the film was dust free and thorough hard. These times were determined in the following manner. Within 24 to 48 hours after preparation of the formulation, a film was applied on a polished plate glass panel by means of a 0.006 inch "Bird" applicator delivering a wet film thickness of 0.003 inch. The film was allowed to dry in an environmental room at constant temperature and humidity, illuminated by artifical light and allowing 95% reproducibility. The drying times of the film were determined by the improved Gardner circular drying time recorder over a period of 24 hours. The recorder basically consists of a synchronous motor with its shaft oriented in the true vertical. A pivotable arm assembly is attached to this shaft and operates a counterpoised vertical stylus consisting of a thermosetting Teflon sphere which does not stick to the drying film. When the stylus, set in motion by the motor, no longer leaves a clear channel but begins to rupture the dry upper layer of the film, the surface may be considered to be "dust free." When the stylus no longer ruptures the film but moves freely on its surface the film may be considered "thorough hard."

EXAMPLE 1

Cobalt (II) halides monoazine complexes were prepared by the following general procedure: To 0.1 mole of the cobalt halide in 50 ml. of methanol was added at room temperature a solution of 0.1 mole of azine in 50 ml. of acetone. The mixture was stirred for fifteen minutes and the resulting bright, colored precipitate was filtered and washed with cold methanol. The dry chelates are very stable in air and are soluble in dimethyl formamide. The infra-red spectrography of these mono azines reveals a medium to strong absorption band at 995 to 970 cm.$^{-1}$ characteristic of a nitrogen-nitrogen linkage in bidentate coordination with the metal.

Table 1 summarizes some analytical data obtained from a series of cobalt (II) halides mono cyclohexanone azine complexes, an acetone azine complex and a propionaldehyde azine complex.

TABLE 1

|  | Calculated | | | | | Found | | | | |
| --- | --- | --- | --- | --- | --- | --- | --- | --- | --- | --- |
|  | C | H | N | Co | Hal | C | H | N | Co | Hal |
| Cobalt chloride acetoneazine | 29.8 | 5.0 | 11.6 | 24.3 | 29.3 | 29.4 | 5.2 | 11.0 | 24.0 | 29.9 |
| [Co(II)(C₆H₁₀=N—N=C₆H₁₀)]Cl₂ | 44.7 | 6.2 | 8.7 | 18.3 | 22.0 | 43.5 | 6.3 | 8.9 | 18.4 | 21.2 |
| [Co(II)(C₆H₁₀=N—N=C₆H₁₀)]Br₂ | 35.0 | 4.9 | 6.8 | 14.3 | 38.9 | 35.0 | 4.9 | 6.8 | 14.2 | 39.1 |
| [Co(II)(C₆H₁₀=N—N=C₆H₁₀)]I₂ | 28.5 | 3.9 | 5.5 | 11.6 | 50.0 | 28.7 | 4.0 | 5.5 | 11.6 | 50.4 |
| Cobalt chloride propionaldazine | 29.8 | 5.0 | 11.6 | 24.3 | 29.3 | 30.0 | 5.5 | 10.9 | 24.1 | 30.1 |

The cobalt chloride cyclohexanone azine complex was deep blue, the cobalt bromide cyclohexanone azine complex was pale blue and the cobalt iodide cyclohexanone azine complex was green. The cobalt bromide cyclohexanone azine complex had the following infra-red spectra from potassium bromide wafers using a Perkin-Elmer 337 grating spectrophotometer; 2910 vs, 2850 vs, 1590 vs, 1445 s, 1350 m, 1315 m, 1280 w, 1250 m, 1140 w, 1030 w, 995 s, 915 v, 865 m, 665 w.

The other cobalt II chloride, bromide, and iodide azine complexes used in the later examples, unless otherwise indicated, were made in the same manner as described in this example. They were all bright colored solids. To hasten the reaction in some cases, it is desirable to heat slightly. Thus in making the cobalt iodide cyclopentanone azine complex, the cobalt bromide cyclopentanone azine complex and the cobalt chloride cyclopentanone azine complex, it is desirable to heat slightly.

Some of the lower alkyl aldazines and ketazines formed resinous complexes. These are useful in the same manner as the monomeric complexes.

EXAMPLE 2

(Cyclohexanone azino) cobalt (II) bromide (also called cobalt bromide cyclohexanone azine)

A solution of 21.9 g. (0.1 mol) of anhydrous cobalt (II) bromide in 50 ml. of dry acetone was added slowly, under agitation, to a solution of 19.2 g. (0.1 mol) of cyclohexanone azine in 50 ml. of dry acetone at room temperature. After maintaining the agitation for 15 to 20 minutes, the resulting blue precipitate was filtered, washed with acetone and dried. The 41 g. of dry blue powder represented a quantitative yield of (cyclohexanone azino) cobalt (II) bromide calculated for $$[(C_6H_{10}{=}N{-})_2Co(II)]Br_2$$

percent: C=35.06; H=4.90; N=6.81; Br=38.88; Co=14.33. Found (percent): C=35.08; H=4.99; N=6.79; Br=39.10; Co=14.15.

This procedure can also be used to make the other azine complexes of the invention.

EXAMPLE 3

(Benzophenone azino) cobalt (II) bromide (cobalt bromide benzophenone azine)

27.1 g. (0.1 mol) of anhydrous bis (hydrazino) cobalt (II) bromide (a known compound prepared from cobaltous bromide and hydrazine), was reacted with 100 g. of recrystallized benzophenone at 300° C. for one hour or until the green solution appears homogeneous. After cooling, the reaction product was washed with methyl ethyl ketone, thus eliminating the excess benzophenone. The resulting 34.4 g. of a blue powder represented a 62% yield of (benzophenone azino) cobalt (II) bromide.

Calculated for $[(C_{13}H_{10}{:}N{-})_2Co(II)]Br_2$ (percent): C=51.9; H=3.6; N=5.0; Br=28.8; Co=10.6. Found (percent): C=52.0; H=4.06; N=4.80; Br=28.62; Co=10.8.

The benzophenone azine complex, contrary to the general rule, could not be prepared by the process of claim 1. The process of Example 3, however, can be used to prepare other complexes within the invention.

EXAMPLE 4

Biacetyl cyclohexanone diazino) cobalt (II) bromide (A) 27.4 g. (0.1 mol) of biacetyl cyclohexanone diazine (prepared from biacetyl dihydrazone and cyclohexanone), was intimately blended with 21.9 g. (0.1 mol) of anhydrous cobaltous bromide. The mixture was heated up to 150 to 200° C. for 15 minutes in a well ventilated hood and behind adequate shield protection.

After cooling, the reaction mixture was dissolved in a minimum amount of methyl ethyl ketone and the complex was precipitated with n-hexane. 27 g. of (biacetyl cyclohexanone diazino) Co (II) bromide, a light green powder, was filtered off and dried (55% yield).

Calculated for $[(C_{16}H_{26}N_4)Co(II)]Br_2$ (percent): C=38.9; H=5.3; N=11.4; Br=32.5; Co=11.9. Found (percent): C=37.8; H=5.12; N=11.1; Br=32.6; Co=11.5.

(B) 44.7 g. (0.1 mol) of bis(biacetyl dihydrazone) cobalt (II) bromide prepared from biacetyl dihydrazone and cobaltous bromide (II) was suspended in 500 ml. of cyclohexanone. The reaction mixture was refluxed until the complex dissolved and the water of condensation was eliminated by azeotropic distillation. Upon cooling, 56.2 g. of (biacetyl cyclohexanone diazino) cobalt (II) bromide (83% yield) was obtained by precipitation with n-hexane.

Found (percent): C=38.95; H=5.55; N=9.88; Br=33.53; Co=11.74.

In general, the cyclohexanone complexes are most stable and are preferred.

EXAMPLE 5

Mixed ligands bidentate chelates of cobalt II halides containing at least one azine were prepared following the general procedure below:

0.1 mole of $[Co(II)(Az)]X_2$, where Az is a ketazine or aldazine, is dissolved in about 50 ml. of dimethyl formamide. To that solution is added 0.1 mole of a bidentate ligand other than an azine as defined in the disclosure and the reaction mixture is allowed to stand at room temperature for several hours. The evaporation of the solvent leaves a quantitative amount of the mixed ligand chelate which can then be used as a catalyst.

For example, the procedure above was used for the preparation of 2,2'-bipyridyl-cyclohexanone azine cobalt (II) chloride the elemental analysis of which gave the following results:

|  | Calculated | | | | | Found | | | | |
|---|---|---|---|---|---|---|---|---|---|---|
|  | C | H | N | Co | Cl | C | H | N | Co | Cl |
| [Co(II)(Az)(Bipy)]Cl₂ | 55.2 | 5.9 | 11.7 | 12.3 | 14.6 | 54.6 | 5.6 | 11.7 | 12.7 | 14.9 |

In place of bipyridine, there can be used any of the other bidentate ligands disclosed above.

EXAMPLE 6

Dimethylformamide-cyclohexanone azine-cobalt (II) bromide, a mixed ligand complex in which the azine is the only bidentate ligand present, was prepared by slow evaporation of a saturated solution of cyclohexanone azine cobalt (II) bromide in dimethyl formamide. The elemental analysis of the purple deliquescent crystals melting at 40–50° C. correspond to the mixed ligand structure.

|  | Calculated, percent | | | | Found, percent | | | |
|---|---|---|---|---|---|---|---|---|
|  | C | H | N | Co | C | H | N | Co |
| [Co(II)(Az)(DMF)]Br₂ | 22.3 | 5.6 | 8.6 | 12.2 | 23.4 | 5.17 | 9.29 | 12.58 |

In the solution there are present 4 dimethyl formamide units in the complex. In place of dimethyl formamide, any of the other unidentate ligands disclosed can be used.

EXAMPLE 7

The polymerization of 50 g. of Laminac 4152, (a styrene modified rigid polyester resin of low reactivity and of medium molecular weight, viscosity 4–5 poises at 77° C., manufactured by the American Cyanamid Co.), was initiated by the addition of 0.5 g. of methyl ethyl ketone peroxide and 0.5 g. of a 4% (as cobalt metal) solution of the respective cobalt II halide-azine complexes of Table 2 in dimethyl acetamide.

The gel time for each sample was determined at 22° C. on a comparative viscosimeter capable of measuring the length of time required to reach the point of gelation. The cure time and peak exotherm were determined on a West single pen recording potentiometer. One sample was accelerated with 0.5 g. of cobaltus 2-ethylhexoate (4% Co) and used as a control.

TABLE 2

| Accelerators | Gel time, min. | Cure time, min. | Peak exotherm, °C. |
|---|---|---|---|
| Cobalt II chloride-cyclohexanone benzaldazine | 2.5 | 12 | 125 |
| Cobalt II bromide-cyclohexanone azine | 3 | 10 | 150 |
| Cobalt II iodide-benzaldazine | 2.7 | 13 | 120 |
| Cobalt II chloride-benzophenone acetone azine | 3.6 | 12 | 110 |
| Cobalt II bromide-cyclohexanone benzaldazine | 2.9 | 14 | 121 |
| Cobalt-2 ethyl hexoate | 22.5 | 65 | 90 |

In place of the Laminac 4152 in Example 7, the use of Polyester A gives similar results.

EXAMPLE 8

The experiment of Example 7 was repeated using the same quantities of Laminac resin and peroxide but varying the amount of accelerator following Table 3. The accelerator was a solution of cobalt II bromide-cyclohexanone azime complex (4% Co) in dimethyl formamide.

TABLE 3

| Accelerator concentration. g./50 g. of resin | Gel time, min. | Cure time, min. | Peak exotherm, °C. |
|---|---|---|---|
| 0.5 | 3 | 10 | 150 |
| 0.4 | 3 | 10 | 130 |
| 0.3 | 3 | 12 | 130 |
| 0.2 | 3 | 13 | 130 |
| 0.1 | 6 | 30 | 120 |

Similar results are obtained when Polyester A is substituted for the Laminac 4152.

EXAMPLE 9

50 g. of CX 586, a high molecular weight, low reactivity styrene modified polyester resin manufactured by the Chevron Chemical Co., was catalyzed at 22° C. with 0.5 g. of benzoyl peroxide and 0.5 g. of solid 2,2' bipyridyl benzaldazine cobalt II bromide complex finely dispersed in the resin. The system gelled after 17.5 min. and cured after 8.5 hours, which compares favorably with a similar system accelerated with 0.5 g. of cobaltus naphthenate (6% Co) which did neither cure or gel after several days. Similar results are obtained when Polyester I is substituted for the CX 586.

EXAMPLE 10

A typical long oil alkyd test paint formulation was prepared consisting of (a) a grind containing 1265 g. of titanium dioxide, 1000 g. of 505-70 alkyd resin, a pure soya based long oil alkyd resin having about 63% soya oil and 23% phthalic anhydride, acid No. 10 maximum, manufactured by the McCloskey Varnish Co., 115 g. of "Rule 66" Mineral Spirits and (b) a let down containing 1145 g. of the same 505-70 alkyd vehicle and 500 g. of the same "Rule 66" solvent. To 50 g. of the above composition was added 0.05 g. of methyl ethyl ketoxime as an antiskinning agent and 0.1 g. of solid or 0.4 of a solution of respectively the several cobalt II halide complexes reported in Table 4. (The solutions were standardized at a uniform 6% cobalt content). All systems were evaluated under the standard procedure set forth above at a room temperature of 32° C. and 30% humidity and compared to two systems, one containing 0.4 g. of cobalt naphthenate (6% Co) as a drying catalyst, the other containing no catalyst at all. The results are summarized in Table 4.

TABLE 4

| Drying catalyst | Dust free, hours | Thru hardness, hours |
|---|---|---|
| Cobalt II chloride acetone azine in cyclohexanone | 12 | 24 |
|  | 3 | 19 |
| Cobalt II bromide-benzaldazine in dimethyl formamide | 11 | 23 |
|  | 2.5 | 20 |
| Cobalt II chloride-2.2'bipyridine-cyclohexanone azine in 2-cyclohexene cyclohexanone | 13 | 27 |
|  | 5 | 21 |
| Cobalt II bromide 2.2'bipyridine benzaldazine in dimethyl sulfoxide | 12.5 | 29 |
|  | 4 | 23 |
| Cobalt II iodide 1.10-phenanthroline-cyclopentanone azine in pyrrole | 12 | 30 |
|  | 3 | 24 |
| Cobalt II chloride diacetyl monoxime-acetaldazine in aniline | 15 | 29 |
|  | 6 | 20 |
| Cobaltous naphthenate | 5 | 23 |
| No catalyst | Wet | Wet |

In place of the 505-70 alkyd resin in Example 10, the same amount of alkyd I gives similar results.

EXAMPLE 11

The drying of 50 g. of the basic 505-70 alkyd resin formulation of Example 10, but containing no titanium dioxide and no antiskinning agent, was catalyzed by the addition of 0.4 g. of a dimethyl formamide solution (6% Co) of the three cobaltus complexes of Table 5 and these systems were compared to an unpromoted system.

TABLE 5

| Catalyst | Dust free, hours | Thru hardness, hours |
|---|---|---|
| No catalyst | Wet | Wet |
| Cobalt II chloride-acetonebenzaldazine | 4 | 23 |
| Cobalt II bromide-cyclohexanone azine | 5 | 19 |
| Cobalt II bromide 2.2'bipyridine acetaldazine | 6 | 29 |

In place of the 505-70 alkyd resin in Example 11, there can be used the same amount of alkyd H with similar results.

EXAMPLE 12

50 g. of the Laminac polyester resin of Example 7 containing 0.5 g. of methyl ethyl peroxide as primary catalyst and 0.5 g. of cobaltous naphthenate (6% Co) as accelerator was applied as a 0.003 in film on a plate glass panel and the drying time was evaluated following the general procedure of Example 7 at a room temperature of 22° C. The film was never able to dry and remained tacky for several days.

A similar formulation containing 0.5 g. of a dimethyl formamide solution of cobalt II bromide cyclohexanone azine complex (6% Co) instead of the cobaltous naphthenate was able to dry to the dust free state within three hours and completely cured in less than 24 hours, the accelerator having overcome the air inhibition process observed with the prior formulation.

In place of the Laminac resin, Polyester A can be used with similar results.

As used in the claims, unless otherwise indicated, it will be understood that Formula 1 is generic to the cobalt halide azine alone or together with one or more unidentate and/or bidentate ligands.

What is claimed is:

1. Cobalt II halide azine complexes of the formula

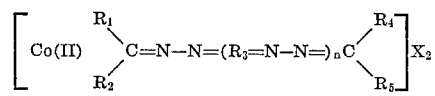

where $R_1$ and $R_4$ are hydrogen, alkyl, hydrocarbyl aryl, haloaryl, haloalkyl, aralkyl, furyl or tetrahydrofuryl and $R_2$ and $R_5$ are alkyl, hydrocarbyl aryl, haloaryl, haloalkyl, aralkyl, furyl, or tetrahydrofuryl, or

together is cycloalkyl of at least 3 carbon atoms and

together is cycloalkyl of at least 3 carbon atoms, $R_3$ is alkylene or arylene, $n$ is 0 or 1 and X is halogen.

2. A compound according to claim 1 wherein X is Cl, Br or I.

3. A compound according to claim 2 wherein $n$ is 0.

4. A compound according to claim 3 wherein $R_1$ and $R_2$ are joined to C to form a cycloalkyl group

of 5 to 6 carbon atoms.

5. A compound according to claim 4 wherein $R_4$ and $R_5$ are joined to C to form a cycloalkyl group

of 5 to 6 carbon atoms.

6. A compound according to claim 5 which is cobalt (II) cyclohexanone azine chloride, bromide or iodide.

7. A compound according to claim 4 wherein $R_4$ is hydrogen and $R_5$ is phenyl.

8. A compound according to claim 4 wherein $R_4$ and $R_5$ are both lower alkyl.

9. A compound according to claim 3 wherein $R_1$ and $R_4$ are hydrogen, lower alkyl or phenyl and $R_2$ and $R_5$ are lower alkyl or phenyl.

10. A compound according to claim 2 wherein $n$ is 1 and $R_3$ is lower alkylene.

References Cited
UNITED STATES PATENTS 2,877,252   3/1959   Hein et al. _____ 260—439 R

OTHER REFERENCES

Straton Dissert. Abst., vol. 19 (1956), p. 668.
Gudkova et al. Chem. Abst., 58 (1963), col. 5501.

TOBIAS E. LEVOW, Primary Examiner

A. P. DEMERS, Assistant Examiner

U.S. Cl. X.R.

106—264; 252—431 N; 260—16, 22 R, 22 CQ, 31.2 XA, 75 UA, 270 R, 315, 346 IM, 347.8, 429 J, 863, 864